United States Patent
Marshall

(10) Patent No.: US 7,061,142 B1
(45) Date of Patent: Jun. 13, 2006

(54) INLINE POWER DEVICE DETECTION

(75) Inventor: Robert A. Marshall, Georgetown, TX (US)

(73) Assignee: Cisco Technology, Inc., San Jose, CA (US)

(*) Notice: Subject to any disclaimer, the term of this patent is extended or adjusted under 35 U.S.C. 154(b) by 377 days.

(21) Appl. No.: 10/447,419

(22) Filed: May 28, 2003

(51) Int. Cl.
H03K 3/00 (2006.01)

(52) U.S. Cl. .................... 307/106; 307/105
(58) Field of Classification Search ............ 307/105, 307/106
See application file for complete search history.

(56) References Cited

U.S. PATENT DOCUMENTS

| | | | |
|---|---|---|---|
| 4,131,767 A | 12/1978 | Weinstein | 179/170.2 |
| 4,161,719 A | 7/1979 | Parikh et al. | 340/147 SY |
| 4,232,199 A | 11/1980 | Boatwright et al. | 179/18 B |
| 4,397,020 A | 8/1983 | Howson | 370/105 |
| 4,532,626 A | 7/1985 | Flores et al. | 370/85 |
| 4,599,494 A | 7/1986 | Welty | 179/84 T |
| 4,626,954 A | 12/1986 | Damiano et al. | 361/96 |
| 4,710,949 A | 12/1987 | Ahuja | 379/26 |
| 4,723,267 A | 2/1988 | Jones et al. | 379/93 |
| 4,733,389 A | 3/1988 | Puvogel | 370/5 |
| 4,875,223 A | 10/1989 | Curtis | 375/36 |
| 4,969,179 A | 11/1990 | Kanare et al. | 379/33 |
| 5,029,201 A | 7/1991 | Bindels | 379/98 |
| 5,034,948 A | 7/1991 | Mizutani et al. | 379/79 |
| 5,056,131 A | 10/1991 | Kanare et al. | 379/33 |
| RE33,900 E | 4/1992 | Howson | 370/105 |
| 5,199,049 A | 3/1993 | Wilson | 375/104 |
| 5,223,806 A | 6/1993 | Curtis et al. | 333/12 |
| 5,311,518 A | 5/1994 | Takato et al. | 370/110.1 |
| 5,321,372 A | 6/1994 | Smith | 333/1 |
| 5,365,177 A * | 11/1994 | Hamp et al. | 324/547 |
| 5,369,680 A * | 11/1994 | Borbas et al. | 379/10.02 |
| 5,406,260 A | 4/1995 | Cummings et al. | 340/568 |
| 5,541,957 A | 7/1996 | Lau | 375/258 |
| 5,574,748 A | 11/1996 | Vander Mey et al. | 375/204 |
| 5,655,077 A | 8/1997 | Jones et al. | 395/187.01 |
| 5,659,542 A | 8/1997 | Bell et al. | 370/496 |
| 5,671,354 A | 9/1997 | Ito et al. | 395/187.01 |
| 5,684,950 A | 11/1997 | Dare et al. | 395/187.01 |
| 5,796,185 A | 8/1998 | Takata et al. | 307/140 |
| 5,799,040 A | 8/1998 | Lau | 375/258 |
| 5,802,042 A | 9/1998 | Natarajan et al. | 370/255 |
| 5,811,962 A * | 9/1998 | Ceccherelli et al. | 323/282 |
| 5,815,665 A | 9/1998 | Teper et al. | 395/200.59 |
| 5,918,016 A | 6/1999 | Brewer et al. | 395/200.5 |

(Continued)

FOREIGN PATENT DOCUMENTS

EP 0 412 422 A2 * 1/1990

(Continued)

OTHER PUBLICATIONS

Kiss, Peter (candidate), "Chapter 3, Cascaded Delta-Sigma ADCs", Thesis; "Politehnica" University of Timisoara; cover page plus pp. 45-71, Dec. 31, 1999.

(Continued)

Primary Examiner—Lynn Feild
Assistant Examiner—Michael Rutland-Wallis
(74) Attorney, Agent, or Firm—Baker Botts L.L.P.

(57) ABSTRACT

According to one embodiment of the invention, a method for providing power to a device coupled to a communications switch through a data line is provided. The method includes determining that the device includes a diode. The method also includes providing power to the device in response to the determination.

22 Claims, 3 Drawing Sheets

U.S. PATENT DOCUMENTS

| | | | |
|---|---|---|---|
| 5,944,824 A | 8/1999 | He | 713/201 |
| 5,947,773 A | 9/1999 | Karam | 439/676 |
| 5,994,998 A | 11/1999 | Fisher et al. | 340/310.01 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 713/201 |
| 6,092,196 A | 7/2000 | Reiche | 713/200 |
| 6,115,468 A | 9/2000 | De Nicolo | 379/413 |
| 6,134,666 A | 10/2000 | De Nicolo | 713/300 |
| 6,140,911 A | 10/2000 | Fisher et al. | 340/310.01 |
| 6,218,930 B1 | 4/2001 | Katzenberg et al. | 340/310.01 |
| 6,295,356 B1 | 9/2001 | De Nicolo | 379/413 |
| 6,308,240 B1 | 10/2001 | De Nicolo | 710/300 |
| 6,310,781 B1 | 10/2001 | Karam | 361/764 |
| 6,347,949 B1 | 2/2002 | Edwards et al. | 439/170 |
| 6,459,275 B1* | 10/2002 | Ewalt et al. | 324/539 |
| 6,535,983 B1 | 3/2003 | McCormack et al. | 713/310 |
| 6,541,878 B1 | 4/2003 | Diab | 307/17 |
| 6,762,675 B1 | 7/2004 | Cafiero et al. | 340/10.42 |
| 6,804,351 B1 | 10/2004 | Karam | 379/413 |
| 2002/0063584 A1 | 5/2002 | Molenda et al. | 327/67 |
| 2002/0180592 A1* | 12/2002 | Gromov | 340/310.01 |
| 2003/0087670 A1* | 5/2003 | Muir | 455/557 |
| 2004/0156496 A1 | 8/2004 | Karam | 379/413 |

FOREIGN PATENT DOCUMENTS

| | | |
|---|---|---|
| WO | WO99/553408 | 10/1999 |

OTHER PUBLICATIONS

Daniel Dove, Powepoint Presentation, "Power over the DTE," 30 pages, Jan. 2000.

Robert Muir, Powerpoint Presentation: "Update on Diode Discovery Process," 30 pages, May 2000.

"Data Terminal Equipment (DTE) Power via Media Dependent Interface (MDI)", IEEE P802.3af/D3.01 Revision of IEEE Std. 802.3-2000), 55 pages, May 2002.

"33. Data Terminal Equipment (DTE) Power via Media Dependent Interface (MDI)", Draft Supplement to IEEE Standard 802.3 (IEEE Draft P802.3af/D3.2), pp. 35-38, Sep. 5, 2002.

"Amendment: Data Terminal Equipment (DTE) Power via Media Dependent Interface (MDI)", IEEE Draft P802.3af/D4.3, (IEEE Standards Department, Draft Amendment 802-3-2002), 31 Pages, May 2003.

Hugh Barrass, "Multi-Pair Aggregate Power Distribution"—U. S. Appl. No. 10/287,886, pp. 1-25, Nov. 4, 2002.

Jeffrey D. Provost, "Inline Power Control"—U.S. Appl. No. 10/618,211, pp. 1-15, Jul. 11, 2003.

Daniel C. Biederman, "Inline Power Based Device Communications"—U.S. Appl. No. 10/651,596, pp. 1-27, Aug. 29, 2003.

Cafiero, et al. "Method and Apparatus for Remote Powering of Device Connected to Network" —U.S. Appl No. 10/836,923, pp. 1-16, Apr. 29, 2004.

Roger A. Karam, "Method and Apparatus for Detecting a Compatible Phantom Powered Device Using Common Mode Signaling"—U.S. Appl. No. 10/855.212, pp. 1-29, May 26, 2004.

Schottkky Rectifier, " *International R Rectifier*", Bullentin PD-20558 rev. E, 5 pages, Jan. 2003.

Lan Man Standards Committee of the IEEE Computer Soecity, "*Amendment: Data Terminal Equipment (DTE) Power via Media Dependent Interface (MDI)*", IEEE Draft P802.3af/D4.01., 128 pages, Jan. 2003.

* cited by examiner

INLINE POWER DEVICE DETECTION

TECHNICAL FIELD OF THE INVENTION

This invention relates generally to the field of electronic devices and more particularly to inline power device detection.

BACKGROUND OF THE INVENTION

A communications switch, such as an ethernet switch, allows a plurality of communications devices to communicate with each other. To establish a conduit for data between the communications switch and the communications device, a connector may be coupled to a printed circuit board ("PCB") of the communications switch so that the communications device may plug into the connector to establish a data conduit. Such a connector is often referred to as a "jack." Some communications switches also provide power through the jack, eliminating the need for the communications device to have a separate power source. Providing power through the jack is referred to as "inline power."

A communications device that is not configured to receive inline power relies on a separate AC or DC power source for power. Such a communications device may be damaged when the device is plugged into a jack that provides inline power. For example, ethernet inline power may destroy the bob smith termination resistors that are coupled to the center tap of isolation transformers in the communications device.

SUMMARY OF THE INVENTION

According to one embodiment of the invention, a method for providing power to a device coupled to a communications switch through a data line is provided. The method includes determining that the device includes a diode. The method also includes providing power to the device in response to the determination.

Some embodiments of the invention provide numerous technical advantages. Some embodiments may benefit from some, none, or all of these advantages. For example, in one embodiment, communications devices may be plugged into an inline power jack for data communication regardless of whether the device is configured to receive inline power. In one embodiment, the probability of damage to communications devices that are not configured to receive inline power is reduced. In one embodiment, inline power is automatically turned on or off depending on the power configuration of the communications device.

Other technical advantages may be readily ascertained by one skilled in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1 through 4B of the drawings, like numerals being used for like and corresponding parts of the various drawings.

Figure 1:
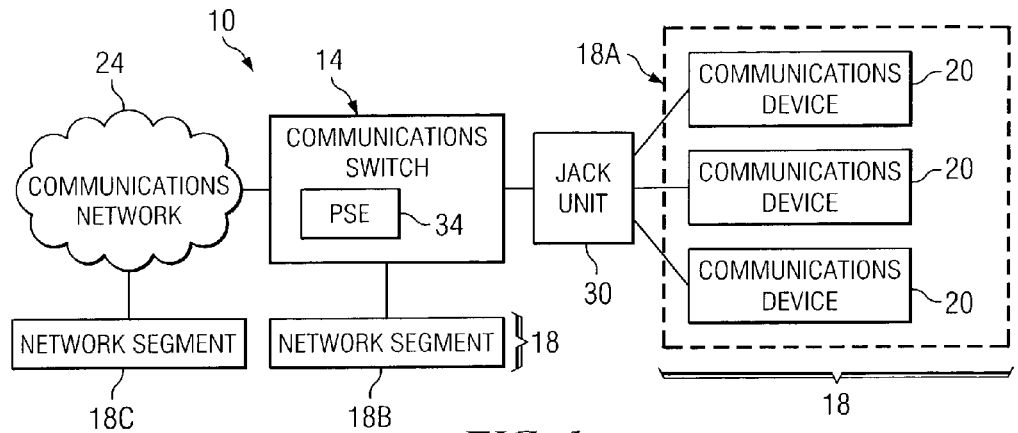
FIG. 1 is a schematic diagram illustrating one embodiment of a communications system that may benefit from the teachings of the present invention.

FIG. 1 is a schematic diagram illustrating one embodiment of a communications system 10 that may benefit from the teachings of the present invention. System 10 comprises network segments 18A through 18C that are coupled to each other over a communications network 24 and/or a communications switch 14. Network segments 18A through 18C are jointly referred to as network segments 18. As shown in FIG. 1, network segment 18A is coupled to network segment 18B over communications switch 14. Network segment 18C is coupled to network segments 18A and 18B over communications network 24 and communications switch 14. More or less network segments 18 may be coupled to each other over communications network 24 and communications switch 14.

Network segments 18A through 18C each comprise one or more communications devices 20. A jack unit 30 is coupled to communications switch 14 to provide one or more ports (not explicitly shown) that may be used to physically connect communications devices 20. For example, a cable having plugs may be used to plug in communications devices 20 to jack unit 30. In some embodiments, switch 14 and network segments 18 may be devices that are capable of operating according to the ethernet network standard.

Communications switch 14 may be operable to send and receive packets to and from communications devices 20 according to the addresses of the packets. Upon receiving one or more packets from device 20, switch 14 sends the received packets to a particular communications device 20 that is identified by the included address. Switch 14 may send and receive the packets over network 24, jack unit 30, or any other suitable conduit or a combination of conduits that couples switch 14 to communications devices 20. In some examples, a hub, a router, or any other suitable device may be used instead of switch 14. Communications device 20 may be any communications device that is operable to communicate with other communications devices over a network architecture. Examples of communications device 20 include a Voice over Internet Protocol ("VoIP") phone and a computer. Communications device 20 may also be referred to as a powered device 20.

Jack unit 30 may comprise one or more RJ-45 jacks; however, jack unit 30 may comprise other types of jacks. Where jack unit 30 comprises RJ-45 jacks, communications devices 20 may plug into jack unit 30 using cables having plugs that are adaptable to a RJ-45 jack. Jack unit 30 may also comprise one or more isolation transformers within its housing. An isolation transformer is a transformer that is operable to protect the components of switch 14, such as integrated circuit chips, against excessive common mode voltages from communications devices 20 and/or cables attaching devices 20 to switch 14. Jack 30 generally includes outwardly disposed pins that may be soldered onto the appropriate apertures of a printed circuit board of communications switch 14, thereby electrically coupling the components of jack 30 to the components of communications switch 14. In some embodiments, isolation transformers may be positioned on communications switch 14.

To send and receive packets from switch 14, communications device 20 may establish a physical connection with switch 14. To that end, communications device 20 may plug into jack 30. Along with a physical connection to switch 14, communications device 20 may also require access to power in order to send and receive packets to and from switch 14. Power may be provided to communications device 20 in a variety of ways. For example, alternating current ("AC") power may be provided to communications device 20 by plugging communications device 20 into a wall socket. In another example, communications device 20 may receive direct current ("DC") power from a battery pack. Power may also be provided inline, which refers to transmitting power from switch 14 to communications device 20 over a jack unit and the physical cable that plugs into the jack unit. Such power is referred to as "inline power." A communications device 20 that is configured to receive inline power may not need a separate power source at the physical location of device 20. Such a device is referred to as an inline power device 20.

However, some communications devices 20 are configured to receive inline power through jack unit 30. Such a device is referred to as a non-inline power device 20. If non-inline power device 20 is plugged into jack unit 30 that provides inline power, components of the non-inline power device 20 may be damaged. For example, the bob smith termination resistors coupled to the center tap of the isolation transformers that are within non-inline power device 20 may be damaged, because the resistors are designed to reduce electromagnetic interference, not dissipate inline power.

According to some embodiments of the present invention, a method and a system are provided that allow detection of an inline power device and a non-inline power device. In one embodiment, accidental damage to a non-inline power device may be avoided by allowing any communications devices to be coupled to a jack unit regardless of the device's power configuration. However, some embodiments of the invention may not benefit from this or other advantages associated with the teachings of the present invention. Additional details of example embodiments of the invention are described in greater detail below in conjunction with FIGS. 1 through 4B.

Referring back to FIG. 1, in one embodiment of the invention, a power supply equipment ("PSE") 34 that is operable to distinguish between inline and non-inline power devices 20 is provided. In one embodiment, PSE 34 is operable to detect the presence of a diode in powered device 20, which is a signature component of inline power device, by detecting a non-linear relationship between the voltage and the current levels caused by the diode. In another embodiment, PSE 34 is operable to detect the presence of a diode by detecting a harmonic distortion caused by the diode. PSE 34 may also be operable to turn on or turn off the inline power depending on the presence of a diode in powered device 20.

Figure 2A:
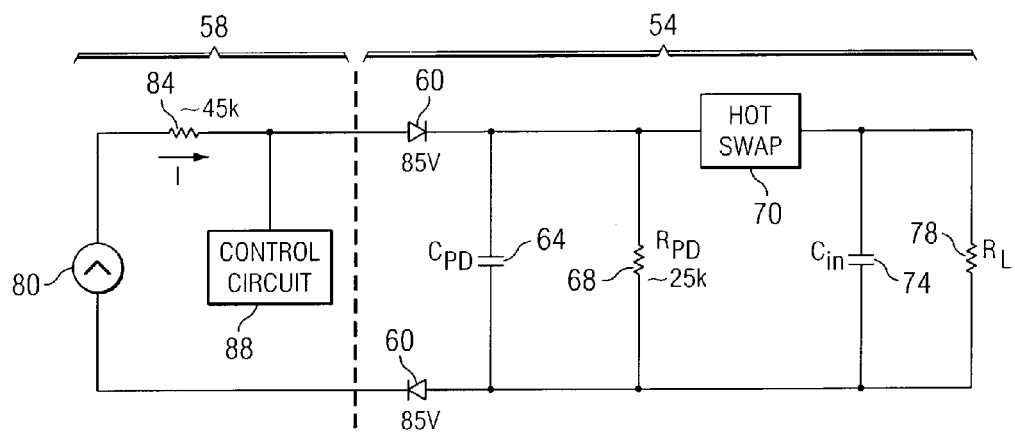
FIG. 2A is a schematic diagram illustrating one embodiment of a circuit of an inline power device detection system that may be used in conjunction with the system shown in FIG. 1.

FIG. 2A is a schematic diagram illustrating a circuit 58 for detecting a diode 60 in a circuit 54. Circuit 54 may be included in inline power device 20 shown in FIG. 1. Circuit 58 may be included in PSE 34 shown in FIG. 1. Circuit 54 represents some components of inline power device 20, and comprises a diode 60, a powered device capacitor 64, a powered device resistor 68, a hot swap circuitry 70, an input capacitor 74, and a load resistor 78. Diodes 60 allow directional current flow when the voltage exceeds a particular level. Such a voltage level is also referred to as a forward bias voltage. Powered device capacitor 64 and powered device resistor 68 provide a signature impedance. Hot swap circuitry 70 is a voltage dependent switch that does not activate until the voltage comes up to a particular level, which allows devices to be swapped while power is activated. Input capacitor 74 and load resistor 78 respectively represent the capacitance and load inherent to inline power device 20. As shown by FIG. 2A, diodes 60 and hot swap circuitry 70 are serially coupled, and capacitor 64, resistor 68, capacitor 74, and load resistor 78 are coupled in parallel. Circuit 54 may represent other types of powered device. But these powered devices each comprise a diode, such as diode 60.

Circuit 58, which is a circuit that may be included in PSE 34 in some embodiments of the invention, comprises a voltage ramp 80, a current sensor resistor 84, and a control circuit 88. Voltage ramp 80 is operable to ramp up the voltage to a level sufficient to forward bias diodes 60 included in circuit 54. For example, in one embodiment where two diodes 60 are each rated at 0.85 volts, voltage ramp 80 may be operable to raise the voltage beyond 1.9 volts. Because diodes 60 are present in circuit 54, a change in the level of current is detected after diodes 60 are forward biased. Current sensor resistor 84, which is coupled to voltage ramp 80, is operable to measure the level of current that is returned from circuit 54. In one embodiment, resistor 84 has a resistance of approximately 45 kΩ; however, resistor 84 may have any other suitable levels of resistance depending on the specific design requirements imposed on circuit 58. When a change in current level is detected and the rate of change in current is determined to be non-linear compared to the rate of voltage change instigated by voltage ramp 80, control circuit 88 is operable to switch on inline power to inline power device 20 that may include circuit 54. By raising the voltage past the forward biasing voltage of diodes 60 and detecting a non-linear relationship between the increase in current and the increase in voltage, circuit 58 is operable to detect the presence of diodes 60 in circuit 54. Additional details regarding the ramping up of voltage and the resulting non-linear change in current are provided below in conjunction with FIG. 3A.

To turn off the inline power when inline power device 20 is uncoupled from circuit 58 of communications switch 14, control circuit 88 may be operable to periodically ramp down the voltage of inline power and determine whether the resulting reduction in current level is non-linearly proportional with the reduction of voltage. If the relationship between the voltage and the current is non-linear, then control circuit 88 raises the voltage of inline power to a level prior to the ramp down and continues to allow inline power to be provided. This is because such a non-linear relationship is caused by diodes 60, which indicates that an inline power device is present. However, if a non-linear relationship is not observed, control circuit 88 may turn off the inline power because the lack of a non-linear relationship indicates that a lack of diodes, which in turn indicates that no inline power device is present. Additional details concerning the non-linear relationship between the voltage level and the current level are provided below in conjunction with FIG. 3B.

Figure 2B:
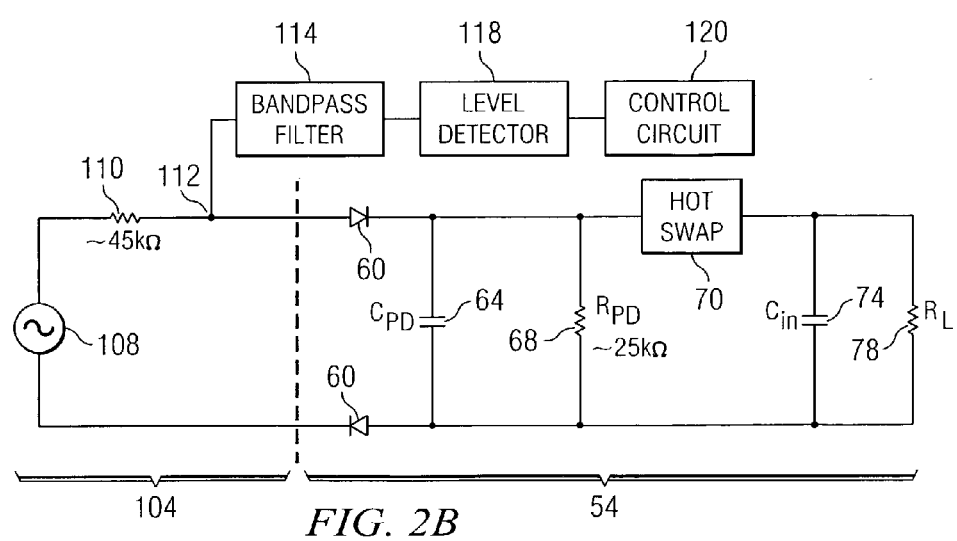
FIG. 2B is a schematic diagram illustrating one embodiment of a circuit of an inline power device detection system that may be used in conjunction with the system shown in FIG. 1.

FIG. 2B is a schematic diagram illustrating a circuit 104 for detecting diode 60 in circuit 54. Circuit 54 may be included in inline power device 20 shown in FIG. 1. Circuit 104 may be included in PSE 34 shown in FIG. 1. Circuit 104 comprises a signal generator 108, and a current sensor resistor 110 that may be serially coupled to signal generator 108 at a node 112. Circuit 104 also comprises a bandpass filter 114, a level detector 118, and a control circuit 120 that are coupled to current sensor resistor 110. In one embodiment, signal generator 108 is operable to generate a sinusoidal signal to circuit 54 through current sensor resistor 110; however, signal generator 108 may be operable to generate any suitable types of signal depending on the specific design requirements imposed on circuit 104. Current sensor resistor 110 allows a measurement of the level of current that is returned from circuit 54. In one embodiment, resistor 110 has a resistance of approximately 45 kΩ; however, resistor 110 may have any other suitable levels of resistance depending on the specific design requirements imposed on circuit 58. Bandpass filter 114 is operable to measure the voltage level at node 112. In one embodiment, bandpass filter 114 is operable to measure the voltage level at different harmonic orders of the signal generated by signal generator 108. For example, if the signal is at 100 Hz, bandpass filter 114 may be operable to measure the voltage level at any or all of the odd harmonics, which includes 300 Hz, 500 Hz, 700 Hz, and 900 Hz. Level detector 118 is operable to determine whether the voltage measured at bandpass filter 114 exceeds a predetermined limit. Control circuit 120 is operable to adjust the level of inline power provided to an inline power device using the determination of level detector 118. In one embodiment, control circuit 120 may turn on or turn off inline power using the determination of level detector 118.

In operation, the current returning from circuit 54 is measured at node 112 and the measured result is sent to bandpass filter 114 and level detector 118. Bandpass filter 114 measures the voltage level and sends the result to level detector 118 to determine whether the measured voltage exceeds a predetermined limit. The determination that the measured voltages exceeds a predetermined limit indicates that a harmonic distortion of the signal generated by signal generator 108 has occurred. A harmonic distortion of a signal occurs when the signal passes through a switch, such as diodes 60. If a harmonic distortion is detected by the combination of bandpass filter 114 and level detector 118, control circuit 120 is operable to turn on inline power for inline power device 20. However, if no harmonic distortion is detected, then control circuit 120 does not turn on inline power. In one embodiment, if a harmonic distortion that was previously present is no longer detected, control circuit 120 may turn off the inline power.

In one embodiment where signal generator 108 is a sine source, bandpass filter 114 measures the voltage at the third harmonic order. This is advantageous in some embodiments because the third order is the harmonic order where the harmonic distortion generated by diode 60 is the strongest, which allows circuit 104 to be less susceptible to noise and thus avoid false detection.

Figure 3A:
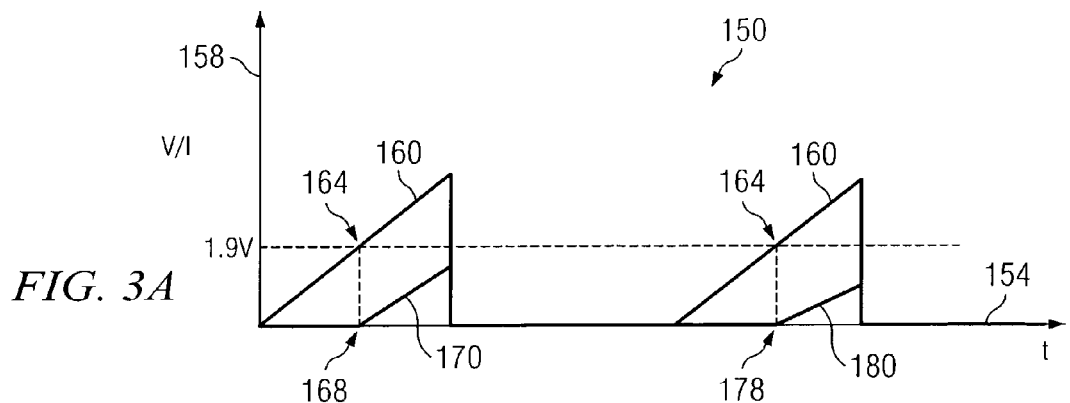
FIG. 3A is a graph illustrating a non-linear relationship between a voltage level and a current level that may be observed at the circuit of FIG. 2A when an inline power device is connected to an inline power jack.

FIG. 3A is a graph 150 illustrating a voltage ramp up and a resulting change in current. Graph 150 comprises a time axis 154 and a voltage/current axis 158, as indicated by "t" and "V/I," respectively. Voltage is increased over a period of time, as indicated by a line 160. At a voltage level indicated by a point 164, which is reached at a time 168, one or more diodes are forward biased. In an example where diodes 60 of FIG. 2A each have a forward bias voltage of 0.85 volts, voltage level indicated by point 164 is 1.9 volts. As shown in FIG. 3A, there is no change in the level of current prior to time 168. However, current rises in response to reaching a voltage (1.9 volts, for example) level that is sufficient to forward bias the diodes in an inline power device, as indicated by a line 170. Although the voltage sufficient to forward bias a diode is indicated as 1.9 volts, other levels of voltage may be used to forward bias different types of diodes. As shown in FIG. 3A, the voltage may be repeatedly raised to reach a forward bias voltage in order to confirm that a connected power device 20 is configured to received inline power. For example, at time 178, the voltage may be raised again to point 164 to forward bias one or more diodes, which increases the current level, as shown by a line 180.

Figure 3B:
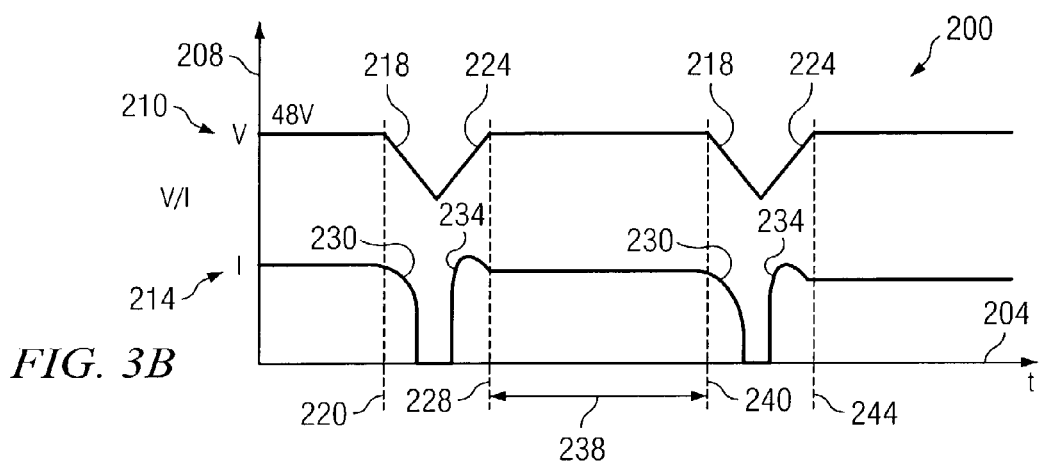
FIG. 3B is a graph illustrating a non-linear relationship between the voltage level and the current level that may be observed at the circuit of FIG. 2A when an inline power device is disconnected from an inline power jack.

FIG. 3B is a graph 200 illustrating a non-linear relationship between voltage and current when the voltage of inline power is spiked down periodically to determine whether inline power device 20 has been disconnected from jack 30. Graph 200 comprises a time axis 204 and a voltage/current axis 208, as indicated by "t" and "V/I," respectively. Lines indicated by reference numerals 210 and 214 respectively illustrate the voltage and current levels. Although inline power may be provided at 48 volts, as indicated in FIG. 3B, inline power may be provided at any suitable voltage level. The spike down of inline voltage level is shown by lines 218 and 224. The beginning of the voltage spike down is indicated by a time 220 and the resumption of the initial inline power voltage occurs at a time 228. A curve 230 of line 214 indicates the decrease of current that corresponds to the decrease of voltage indicated by line 218. A curve 234 of line 214 indicates an increase of the current level corresponding to the increase of voltage shown by line 224. In one embodiment, energy required by load 78 during the spike down may be provided by capacitor 74.

Although the rate of voltage reduction is relatively constant, as shown by line 218, the rate of current reduction is not, as shown by potion 230. Analogously, the rate of voltage increase shown by line 224 is relatively constant, but the rate of the resulting current is not, as shown by curve 234. When the relationship between the voltage and current levels is non-linear, as shown by FIG. 3B, the relationship indicates that an inline power device is still plugged into communications switch 14 and inline power continues to be provided. If a voltage spike down results in a change of current level that does not bear a non-linear relationship to the reduction of voltage level, such a detection indicates that the inline power device has been removed. In response to such a determination, inline power may be turned off.

Repeated voltage spike downs may be used to continually check whether the inline power device is still plugged into jack 30. As shown in FIG. 3B, voltage spike downs may be spaced by a predetermined time period 238. In one embodiment, the predetermined time period may equal 250 microseconds; however, any suitable periods of time that allow normal operation of powered device 20 may be used as predetermined time period 238. Further, any suitable periods of time that allow normal operation of powered device 20 may be used as the time period between time 220 and 228.

Figure 4B:
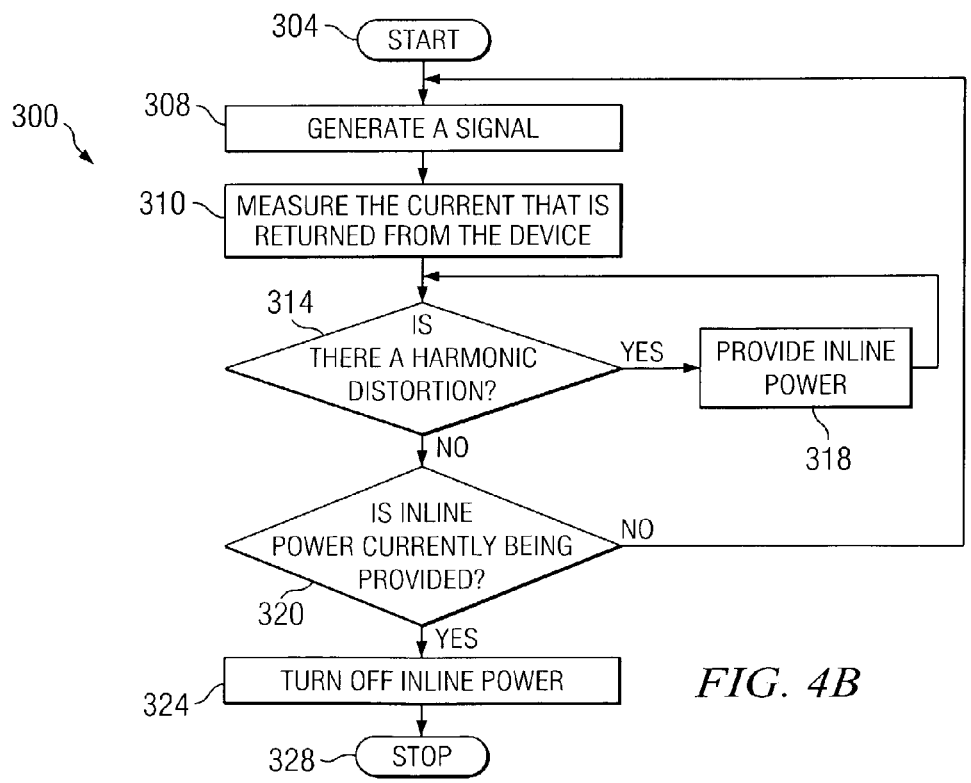
FIG. 4B is a flowchart illustrating one embodiment of a method for inline power device detection.
Figure 4A:
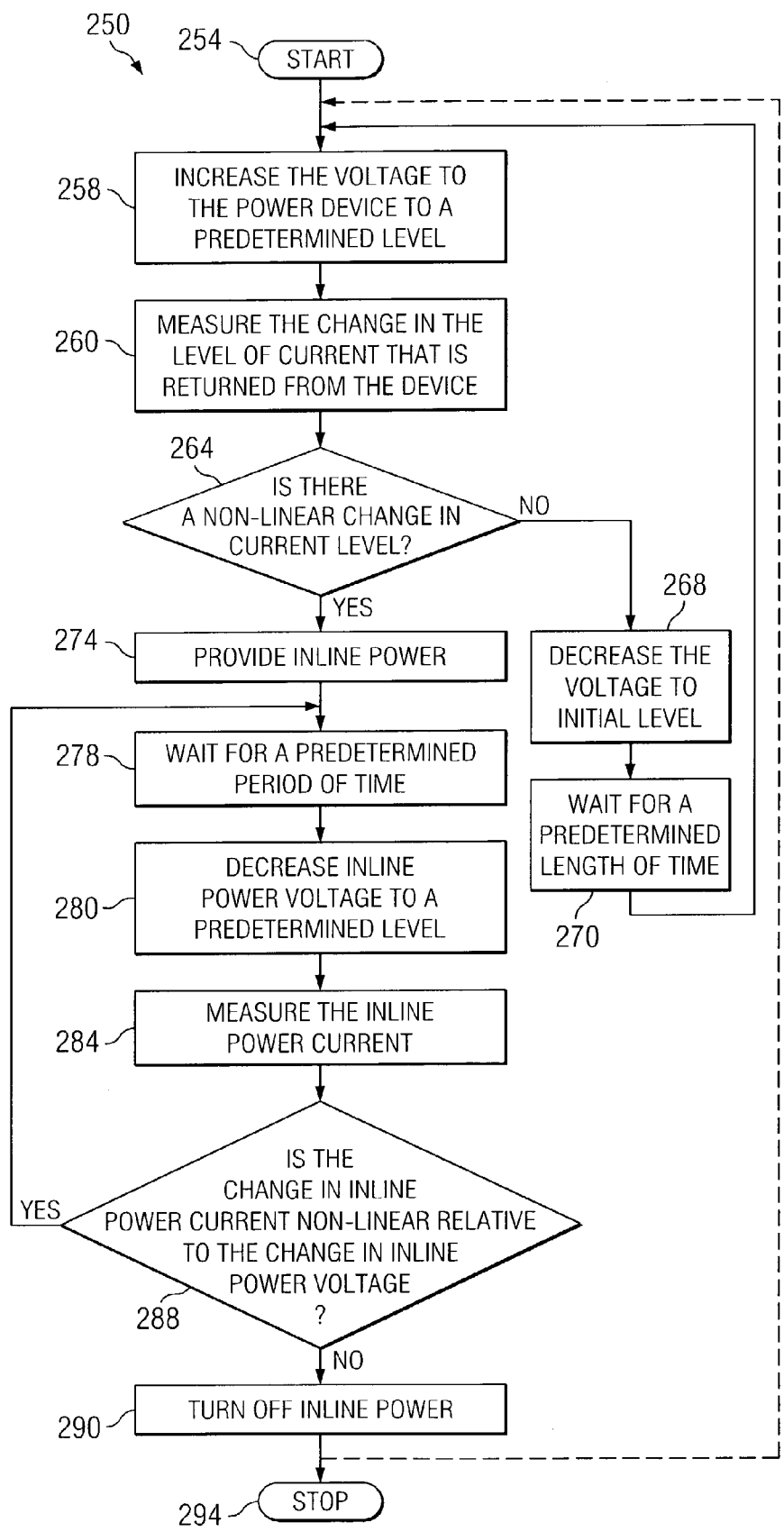
FIG. 4A is a flowchart illustrating one embodiment of a method for inline power device detection.

FIG. 4A is a flowchart illustrating one embodiment of a method 250 for detecting an inline power device, such as inline power device 20. Method 250 starts at 254. Steps 258, 260, and 264 are directed to determining whether a device coupled to a power supply equipment includes a diode. Steps 258, 260, and 264 constitute one way of detecting a diode;

however, any other suitable method to detect a diode may be used. At step 258, voltage to a powered device is increased to a predetermined level. In one embodiment, the predetermined voltage level is determined depending upon the voltage level sufficient to forward bias a diode or a set of diodes. At step 260, the change in the level of current that is returned from the powered device is measured. At decision step 264, whether the change in the measured current level is non-linear compared to the change in voltage is determined. If no, then the "no" branch is followed to step 268 where the voltage is decreased to an initial voltage level. At step 270, a predetermined length of time is allowed to pass. In one embodiment, the predetermined length of time equals approximately half a second; however, any other suitable length of time may be used. In one embodiment, after it is determined that the measured current level has not changed at decision step 264, method 250 may proceed back to step 258 without performing steps 268 and 270.

Referring back to decision step 264, if the change is non-linear, then the "yes" branch is followed to step 274 where inline power is provided. At step 278, a predetermined period of time is allowed to pass. In one embodiment, the predetermined period of time may equal 250 microseconds; however, any other suitable periods of time that allow normal operation of an inline power device may be used. At step 280, the inline power voltage is decreased to a predetermined level. In one embodiment, inline power voltage is decreased by an increment greater than the forward voltage drop of diode 60. For example, inline power voltage may be dropped from 48 volts to 46 volts. However, any other suitable drop in voltage level may be used. At step 284, the inline power current is measured.

At decision step 288, whether the change in inline power current is non-linear relative to the change in inline power voltage is determined. If yes, then the "yes" branch is followed to step 278. If no, the "no" branch is followed to step 290 where inline power is turned off. In one embodiment, method 250 proceeds back to step 258. Method 250 stops at step 294.

FIG. 4B is a flowchart illustrating one embodiment of a method 300 for detecting an inline power device, such as inline power device 20. Method 300 starts at 304. Steps 308, 310, and 314 are directed to determining whether a device coupled to a power supply equipment includes a diode. Steps 308, 310, and 314 constitute one way of detecting a diode; however, any other suitable method to detect a diode may be used. At step 308, a signal is generated and transmitted to communications device 20. In one embodiment, the signal is a sinusoidal signal; however, any suitable type of signal may be used. At step 308, the current that is returned from communications device 20 is measured. At decision step 310, using the measured current, whether a harmonic distortion has occurred in the measured current is determined. If yes, then the "yes" branch in followed to step 318 where inline power is provided to device 20. Then method 300 proceeds back to step 314.

If no harmonic distortion is detected at step 314, then the "no" branch is followed to step 320. At step 320, whether inline power is currently being provided is determined. If yes, then inline power is turned off at step 324 and method 300 proceeds back to step 308. If no, then method 300 proceeds back to step 308. Method 300 stops at step 328.

Although some embodiments of the present invention have been described in detail, it should be understood that various changes, substitutions, and alterations can be made hereto without departing from the spirit and scope of the invention as defined by the appended claims.

What is claimed is:

1. A method for providing power to a device coupled to a communications switch through a data line, comprising:
   determining that the device includes a diode; and
   in response to the determination, providing power to the device; and
   wherein the diode is operable to cause a harmonic distortion of a signal, and wherein determining that the device includes a diode comprises:
   transmitting a test signal at a particular frequency through the device; and
   detecting a harmonic distortion of the test signal at a particular harmonic order of the frequency.

2. The method of claim 1, wherein the test signal is a sinusoidal signal.

3. The method of claim 1, wherein the particular harmonic order is a third harmonic order.

4. The method of claim 1, and further comprising:
   reducing voltage of power provided to the device from an initial level to a level below the bias voltage level;
   detecting a resulting change in a level of current;
   determining that the resulting change in the level of current is non-linearly related to the change in voltage; and
   in response, raising voltage of power back to the initial level.

5. The method of claim 1, wherein the power is at 48 volts.

6. The method of claim 1, and further comprising receiving the device at a jack coupled to the communications device, the jack operable to provide inline power.

7. A method for providing power to a device coupled to a communications switch through a data line, comprising:
   determining that the device includes a diode;
   in response to the determination, providing power to the device; and further comprising:
   reducing voltage of power provided to the device to a level below the bias voltage level;
   detecting a resulting change in a level of current;
   determining that the resulting change in the level of current is not non-linearly related to the change in voltage; and
   in response, turning off the power to the device.

8. A system for providing inline power, comprising:
   a circuit operable to detect a diode of the device;
   a control switch coupled to the circuit the control switch operable to activate inline power from a communications switch in response to a detection of the diode; and
   wherein the diode is operable to cause a harmonic distortion in a signal, and wherein the circuit is operable to detect the diode by transmitting a test signal to the diode and detecting the harmonic distortion in the signal.

9. The system of claim 8, wherein the circuit comprises:
   a signal generator operable to transmit a test signal having a frequency through the device;
   a current sensor coupled to the signal generator, the current sensor operable to measure a change in current of the test signal;
   a bandpass filter coupled to the current sensor and operable to measure a voltage change resulting from the change in current measured by the current sensor;
   a level detector coupled to the bandpass filter and operable to determine that the voltage change measured at the bandpass filter has exceed a predetermined threshold; and wherein the control switch is coupled to the level detector, the control switch operable to activate inline power in response to a determination at the level detector that the measured voltage change has exceed the predetermined threshold.

10. The system of claim 9, wherein the current sensor is a resistor having approximately 45,000 ohms of resistance.

11. The system of claim 8, wherein the test signal is a sinusoidal signal.

12. The system of claim 8, wherein the circuit is further operable to:
reduce voltage of inline power provided to the device from an initial level to a level below a bias voltage level of the diode;
detect a resulting change in a level of current;
determine that the resulting change in the level of current is non-linearly related to the reduction of voltage; and
raise voltage of power back to the initial level.

13. The system of claim 8, wherein the circuit is further operable to:
reduce voltage of inline power provided to the device from an initial level to a level below a bias voltage level of the diode;
detect a resulting change in a level of current;
determine that the resulting change in the level of current is not non-linearly related to the change in voltage; and
deactivate the inline power in response to the determination.

14. The system of claim 8, and further comprising:
a communications switch having a jack, the communications switch operable to provide inline power through the jack, the jack operable to receive a data line of the device; and
wherein the circuit and the control switch are coupled to the communications switch.

15. A method for providing inline power, comprising:
receiving a communications device at a data connector, the communications device comprising a diode;
increasing voltage at the diode to a level sufficient to forward bias the diode;
determining that an increase in current resulting from increasing voltage is non-linearly related to the increase in voltage;
in response to the determination, providing power to the communications device through the data connector; and further comprising:
decreasing voltage of power to a level sufficient to reverse bias the diode;
determining that a decrease in current resulting from decreasing voltage is not non-linearly related to the decrease in voltage; and
in response, turning off the power to the communications device.

16. A method for providing inline power, comprising:
receiving a communications device at a data connector, the communications device comprising a diode operable to initiate a harmonic distortion;
transmitting a signal having a frequency and an initial harmonic state to the diode through the data connector;
determining that a change of the initial harmonic state at a particular harmonic order of the frequency has exceeded a predetermined threshold; and
in response to the determination, providing power to the communications device through the data connector.

17. The method of claim 16, wherein the change of the initial harmonic state is a first change, and further comprising:
determining that a second change of the initial harmonic state at the particular harmonic order of the frequency has fallen below the predetermined threshold; and
in response, turning off the power to the communications device.

18. The method of claim 16, wherein the data connector is coupled to a communications switch, and wherein the signal is generated from the communications switch using a signal generator.

19. The method of claim 16, wherein the signal is a sinusoidal signal.

20. The method of claim 16, wherein the harmonic order is a third harmonic order.

21. The method of claim 16, wherein determining that a change of the initial harmonic state has exceeded a predetermined threshold comprises detecting a change of voltage associated with the initial harmonic state.

22. A method for providing inline power from a communications switch to a communications device through a data connector, the communications device comprising at least one diode, the method comprising:
increasing voltage at a node positioned in the communications switch and electrically coupled to the at least one diode, the voltage increased at an approximately constant rate to a level sufficient to forward bias the diode;
measuring a first current level at the node after increasing voltage but before reaching the level sufficient to forward bias the diode;
measuring a second current level at the node after reaching the level sufficient to forward bias the diode;
determining that the second current level is higher than the first current level;
in response to the determination that the second current level is higher, providing power to the communications device through the data connector;
decreasing voltage of provided power to a level sufficient to reverse bias the at least one diode;
determining that a decrease in current resulting from decreasing voltage is not non-linearly related to the decrease in voltage; and
in response, turning off the power to the communications device.

* * * * *